(12) United States Patent
McFarlane et al.

(10) Patent No.: US 8,485,057 B1
(45) Date of Patent: Jul. 16, 2013

(54) PUSH-PULL CONTROL UTILIZING LINEAR AND ROTATIONAL INPUT

(75) Inventors: David A. McFarlane, Baldwin City, KS (US); Ben Maples, Lawrence, KS (US)

(73) Assignee: Horizon, LLC, Baldwin City, KS (US)

( * ) Notice: Subject to any disclaimer, the term of this patent is extended or adjusted under 35 U.S.C. 154(b) by 271 days.

(21) Appl. No.: 13/110,632

(22) Filed: May 18, 2011

(51) Int. Cl.
*F16H 1/18* (2006.01)
(52) U.S. Cl.
USPC .......... 74/424.91; 74/424.93; 74/424.88; 74/89.45
(58) Field of Classification Search
USPC .......... 74/424.91, 424.93, 424.88, 424.81, 74/89.45
See application file for complete search history.

(56) References Cited

U.S. PATENT DOCUMENTS

| | | | |
|---|---|---|---|
| 2,585,886 A | 2/1952 | Whitlow | |
| 3,169,407 A | 2/1965 | Newell | |
| 4,274,296 A * | 6/1981 | Miller et al. | 74/424.93 |
| 4,741,221 A * | 5/1988 | Hudimac, Jr. | 74/424.9 |
| 4,960,007 A * | 10/1990 | Weyer | 74/424.93 |
| 7,474,176 B2 * | 1/2009 | Henningsson et al. | 333/231 |
| 7,481,130 B2 * | 1/2009 | Yamada et al. | 74/493 |
| 7,559,267 B2 * | 7/2009 | Yamada | 74/493 |

* cited by examiner

*Primary Examiner* — David M Fenstermacher
(74) *Attorney, Agent, or Firm* — Lathrop & Gage LLP (57) ABSTRACT

Push-pull controls utilizing linear and rotational inputs to create linear output are disclosed. One control includes an elongate push rod and a roller pin. The rod has an outer surface, a generally circular cross-section perimeter, a center axis, a proximal end with a user input, and a distal end configured to directly or indirectly interact with an apparatus to be controlled. The rod is rotatable and slidable along the rod axis. The roller pin has a center axis and an outer surface that contacts the push rod outer surface. The roller pin center axis is angularly offset from and non-intersecting with the push rod center axis. The amount of angular offset is greater than zero degrees.

20 Claims, 7 Drawing Sheets

PUSH-PULL CONTROL UTILIZING LINEAR AND ROTATIONAL INPUT

CROSS-REFERENCE TO RELATED APPLICATIONS

None.

BACKGROUND

The invention relates generally to the field of manually-operated push-pull controls. More specifically, the invention relates to the field of push-pull controls that operate with both linear and rotational inputs. Push-pull controls are used in various applications, such as throttle controls and controls for fuel mixtures.

Figure 1:
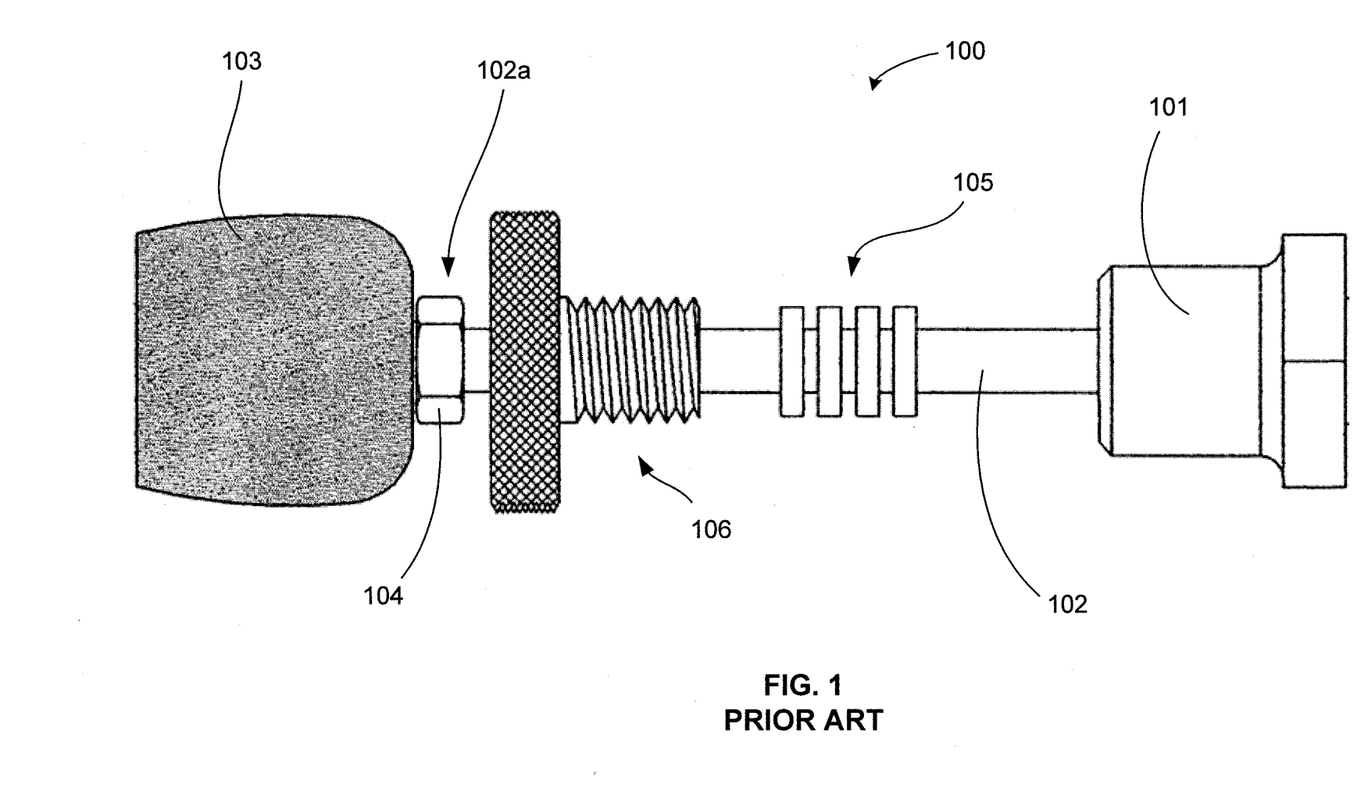
FIG. 1 is a side view of a part of a PRIOR ART push-pull control.

One common prior art push-pull control 100, partially shown in FIG. 1, operates solely using linear input. In the prior art push-pull control 100, a panel nut 101 is fastened to a stationary element (e.g., an instrument panel, a housing, et cetera). A push rod 102 extends through the panel nut 101 and is movable relative to the panel nut 101, and a user input knob 103 is coupled to a proximal end 102a of the push rod 102 (e.g., by nut 104). A distal end (not shown) of the push rod 102 may be coupled to the apparatus being controlled, either directly or (more commonly) through a cable or other force-transferring device. If a cable is used, swiveling apparatus may couple the cable to the push rod 102, such that the cable is not crimped by rotation of the push rod 102.

To allow the push rod 102 to temporarily remain in a desired location relative to the panel nut 101, packing 105 (e.g., leather washers) surrounds the push rod 102, and a friction nut 106 is used to selectively compress the packing 105. Threading on the friction nut 106 is generally received by threading (not shown) in the panel nut 101. The geometry of the friction nut 106 and panel 101 includes internal cones so that the packing 105 is compressed radially inward to increase the friction on the push rod 102. Loosening the friction nut 106 relative to the panel nut 101 allows the packing 105 to relax. When the packing 105 is compressed, friction is formed between the packing 105 and the push rod 102; this friction may allow the push rod 102 to temporarily remain in a desired location relative to the panel nut 101. It should be appreciated that the amount of friction may be modified by adjusting how much the packing 105 is compressed. Even with maximum compression, however, it is generally possible to overcome this friction by pushing or pulling the push rod 102 (when gripping the user input knob 103). Rotating the push rod 102 (e.g., using the user input knob 103), on the other hand, generally has no effect, and various structure may optionally be used to restrict the push rod 102 from rotating relative to the panel nut 101. FIG. 1 shows the friction nut 106 entirely released from the panel nut 101 for illustration, but in use the friction nut 106 would generally be at least minimally coupled to the panel nut 101.

Figure 2:
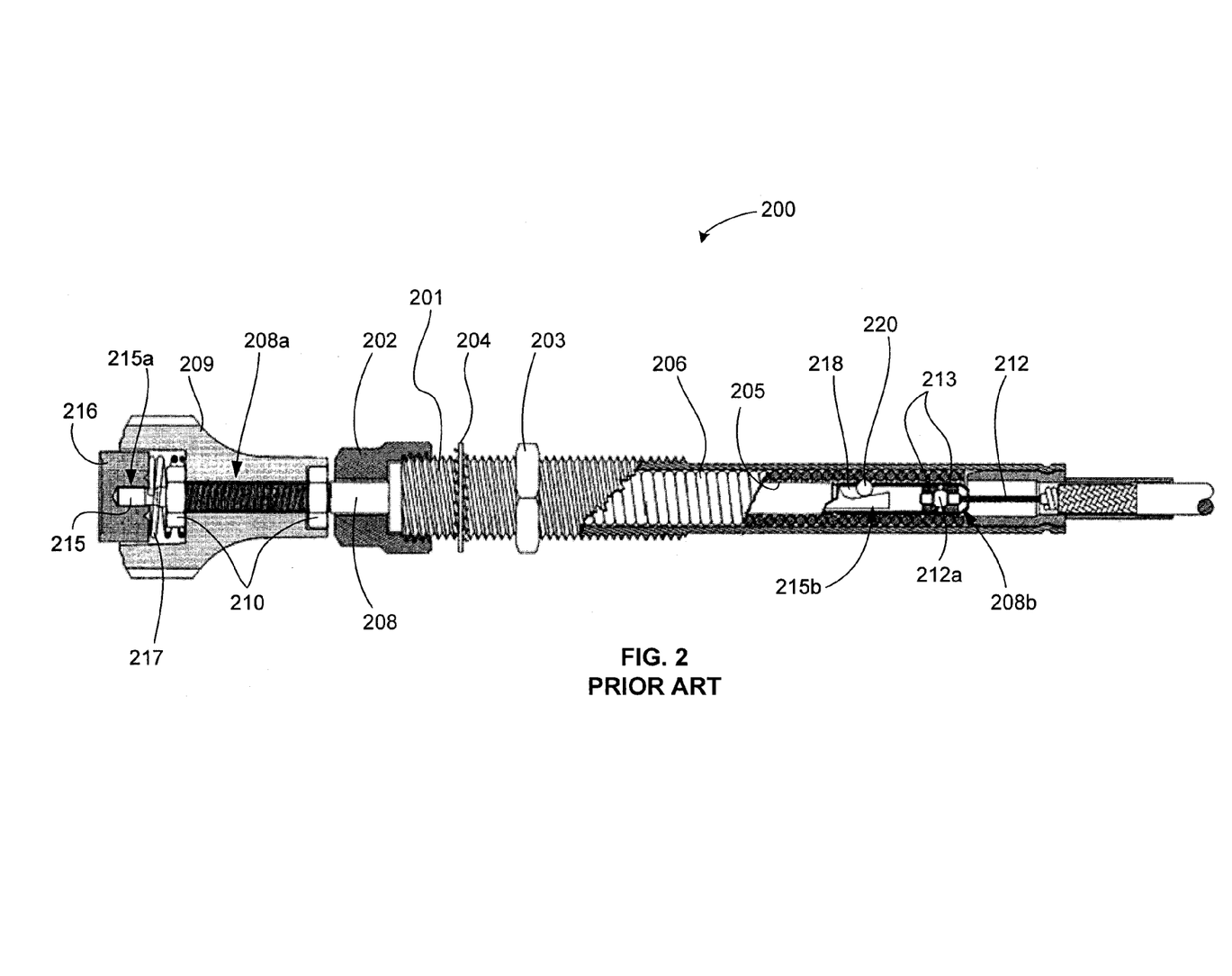
FIG. 2 is a side view of another PRIOR ART control, with sections removed for illustration.

Another prior art push-pull control 200, referred to herein as a Standard Vernier Control, is shown in FIG. 2. A threaded tube 201 is threadably coupled to a panel nut 202, and a nut 203, and the elements 201, 202, 203 are fixed to a stationary element (e.g., an instrument panel, a housing, et cetera) by sandwiching the stationary element between the panel nut 202 and the nut 203. As shown, a lock washer 204 may also be included. The threaded tube 201 is generally hollow, and a helical surface 205 extends along the inside of the threaded tube 201. In the Standard Vernier Control 200, the helical surface 205 is formed by a spring 206.

A push rod 208 extends through the panel nut 202 and inside the threaded tube 201, and a user input knob 209 is coupled to a proximal end 208a of the push rod 208 (e.g., by a pair of nuts 210). A cable 212 is shown coupled to a distal end 208b of the push rod 208 by a pair of bearings 213 surrounding an end 212a of the cable 212 (or "cable terminal" 212a).

A release shaft 215 extends inside the push rod 208, and a release button 216 is coupled to a proximal end 215a of the release shaft 215. A spring 217 biases the button 216, and thus the release shaft 215, to an extended configuration (as shown). A distal end 215b of the release shaft 215 has a wedge-shaped configuration forming a cavity 218, and a ball 220 is positioned inside the cavity 218. When the button 216 and the release shaft 215 are at the extended configuration, the wedge-shaped configuration of the release shaft distal end 215b forces the ball 220 to interact with the helical surface 205 (formed by the spring 206); this interaction prohibits the push rod 208 from being pushed or pulled relative to the threaded tube 201 and the panel nut 202. The ball 220 may travel along the helical surface 205, however. As such, the user input knob 209 may be rotated, causing the push rod 208 to move inwardly/outwardly relative to the threaded tube 201 and the panel nut 202. Depending particularly on the amount of incline in the helical surface 205, inward/outward movement of the push rod 208 may be finely controlled by rotating the user input knob 209 in this manner.

It is not always desirable to rotate the user input knob 209, however, as (for example) it may be desirable to quickly move the push rod 208 a relatively large distance or to move the push rod 208 a relatively large distance without the effort of continuously rotating the user input knob 209. To operate the Standard Vernier Control 200 with linear—instead of rotational—input, the button 216 may be pressed to overcome the force of the spring 217. When the button 216 is pressed, the button 216 and the release shaft 215 are no longer at the extended configuration, and the ball 220 is released and allowed to separate from the helical surface 205. Without the ball 220 interacting with the helical surface 205, the push rod 208 may be pushed or pulled relative to the threaded tube 201 and the panel nut 202. However, rotational input may not be used to move the push rod 208 until the button 216 and the release shaft 215 return to the extended configuration.

While the Standard Vernier Control 200 has been generally well-received by the market, there are at least four disadvantages of the Standard Vernier Control 200. First, the distance that the control 200 can operate using rotational input is limited by the length of the helical surface 205, which can result in a threaded tube 201 that is unacceptably long for some applications. Second, the button 216 must be pressed to allow the push rod 208 to be moved using linear input. Third, if the button is not completely depressed, the linear motion is "ratchety" such that resistance is detected as the ball contacts each thread of the helical surface. Fourth, the ball 220 can "jam", causing it to not automatically release when the button 216 is pressed and the release shaft 215 is no longer at the extended configuration. When this happens, there is a delay before linear input may be used to move the push rod 208. If the Standard Vernier Control 200 is being used to control an aircraft throttle, for example, such a delay could be life threatening or even deadly.

SUMMARY

The present invention is defined by the claims below. According to one embodiment, a push-pull control utilizing both linear and rotational inputs to create linear output (without requiring a user-operated release for switching from rotational input to linear input) includes an elongate push rod, a base, a roller pin, and a rotational assist cartridge. The elongate push rod has proximal and distal ends, a smooth outer surface, a circular cross-section perimeter, and a center axis. The push rod is rotatable and slidable along the push rod axis, and the push rod distal end is configured to directly or indirectly interact with an apparatus to be controlled. A user input is at the push rod proximal end. The base has an opening through which the push rod passes, and rotational and sliding movement of the push rod along the push rod axis is movement relative to the base. The roller pin has a smooth outer surface and a center axis and is rotatable about the roller pin center axis. The rotational assist cartridge is adjacent the push rod and rotatable relative to the base. The rotational assist cartridge positions the roller pins such that: (a) at least one point of the roller pin outer surface contacts the push rod outer surface; and (b) the roller pin center axis is angularly offset and non-intersecting with the push rod center axis.

According to another embodiment, a push-pull control utilizing both linear and rotational inputs to create linear output (without requiring a user-operated release for switching from rotational input to linear input) includes a base, an elongate push rod, a plurality of roller pins separated into first and second groups, and a rotational assist cartridge. The base has an opening through which the push rod passes, and movement of the push rod is movement relative to the base. The elongate push rod has proximal and distal ends, a smooth outer surface, a circular cross-section perimeter, and a center axis. The push rod distal end is configured to directly or indirectly interact with an apparatus to be controlled. A user input is at the push rod proximal end. Each roller pin has a cylindrical central portion, a first spherical end, a second spherical end, a center point, and a center axis; and each roller pin is rotatable about the roller pin center axis. The rotational assist cartridge is adjacent the push rod, and is at least partially housed in the base. The rotational assist cartridge includes a pin cage; first, second, and third pin cups; a resilient member relatively biasing the first and second pin cups toward one another; and a tension nut. The pin cage has a hollow central area and a plurality of pin slots that are through openings extending to the pin cage hollow central area. The pin slots are equiangularly spaced about a center axis of the pin cage, and each pin slot extends along a respective helical path over a length of the pin cage. One roller pin of the first group and one roller pin of the second group are positioned in each pin slot. The center points for each roller pin in the first group lay on one plane generally perpendicular to the pin cage center axis, and the center points for each roller pin in the second group lay on another plane generally perpendicular to the pin cage center axis. The first pin cup is positioned between the first group of roller pins and the push rod proximal end, and has a tapered end abutting the first spherical ends of the roller pins in the first group. The second pin cup is positioned between the second group of roller pins and the push rod distal end, and has a tapered end abutting the first spherical ends of the roller pins in the second group. The third pin cup is positioned between the first and second groups of roller pins. The third pin cup has one tapered end abutting the second spherical ends of the roller pins in the first group, and has another tapered end abutting the second spherical ends of the roller pins in the second group. The tension nut is threadably received by a threaded portion of the base and is movable to adjust spacing between the first, second, and third pin cups. Decreasing spacing between the first, second, and third pin cups causes an increase in forces between the roller pins and the push rod, and increasing spacing between the first, second, and third pin cups causes a decrease in forces between the roller pins and the push rod. At least two points of each roller pin central portion simultaneously contact the push rod outer surface. Each roller pin center axis is angularly offset from and non-intersecting with the push rod center axis, and the amount of angular offset is generally the same for each roller pin and is greater than zero degrees. The push rod is slidable along the push rod axis using linear input regardless of the forces between the roller pins and the push rod, and the push rod slides along the push rod axis upon receiving rotational input when sufficient forces exist between the roller pins and the push rod.

According to still another embodiment, a push-pull control utilizing both linear and rotational inputs to create linear output includes an elongate push rod, at least one roller pin, and a rotational assist cartridge. The elongate push rod has proximal and distal ends, an interaction portion having an unthreaded outer surface, and a center axis. The push rod distal end is configured to directly or indirectly interact with an apparatus to be controlled, and a user input is at the push rod proximal end. Each roller pin has an outer surface and a center axis and is rotatable about the roller pin center axis. The rotational assist cartridge is adjacent the push rod interaction portion, and movement of the push rod is movement relative to the rotational assist cartridge. The rotational assist cartridge positions the at least one roller pin such that: (a) at least two points of each roller pin outer surface simultaneously contact the push rod outer surface; and (b) a central medial plane of each roller pin is angularly offset from a central medial plane through the pushrod that is perpendicular to a theoretical center point of contact between the push rod and each roller pin. The amount of angular offset is generally the same for each roller pin and is greater than zero degrees. Means for adjusting forces between the at least one roller pin and the push rod are also included. The push rod is slidable along the push rod axis using linear input regardless of the forces between the at least one roller pin and the push rod, and the push rod slides along the push rod axis upon receiving rotational input when sufficient forces exist between the at least one roller pin and the push rod.

According to still yet another embodiment, a push-pull control utilizing both linear and rotational inputs to create linear output (without requiring a user-operated release for switching from rotational input to linear input) includes an elongate push rod a roller pin. The elongate push rod has proximal and distal ends, an outer surface, a generally circular cross-section perimeter, and a center axis. The push rod is rotatable and slidable along the push rod axis, and the push rod distal end is configured to directly or indirectly interact with an apparatus to be controlled. A user input is at the push rod proximal end. The roller pin has a center axis and an outer surface that contacts the push rod outer surface. The roller pin center axis is angularly offset from and non-intersecting with the push rod center axis. The amount of angular offset is greater than zero degrees.

BRIEF DESCRIPTION OF THE DRAWINGS

Illustrative embodiments of the present invention are described in detail below with reference to the attached drawings.

FIG. 4b is an exploded view of the rotational assist cartridge of FIG. 4a.

DETAILED DESCRIPTION

Embodiments of the present invention provide push-pull controls that utilize both linear and rotational inputs without a user-operated release for switching from rotational input to linear input.

FIGS. 3 through 9 disclose a push-pull control 300. The control 300 may, for example, be used for an aircraft throttle control, a control for fuel mixtures, or countless other applications where a push-pull control is used. While the disclosure focuses generally on use in the aviation industry, it should be clearly understood that the control 300 is not limited to such applications.

Figure 3:
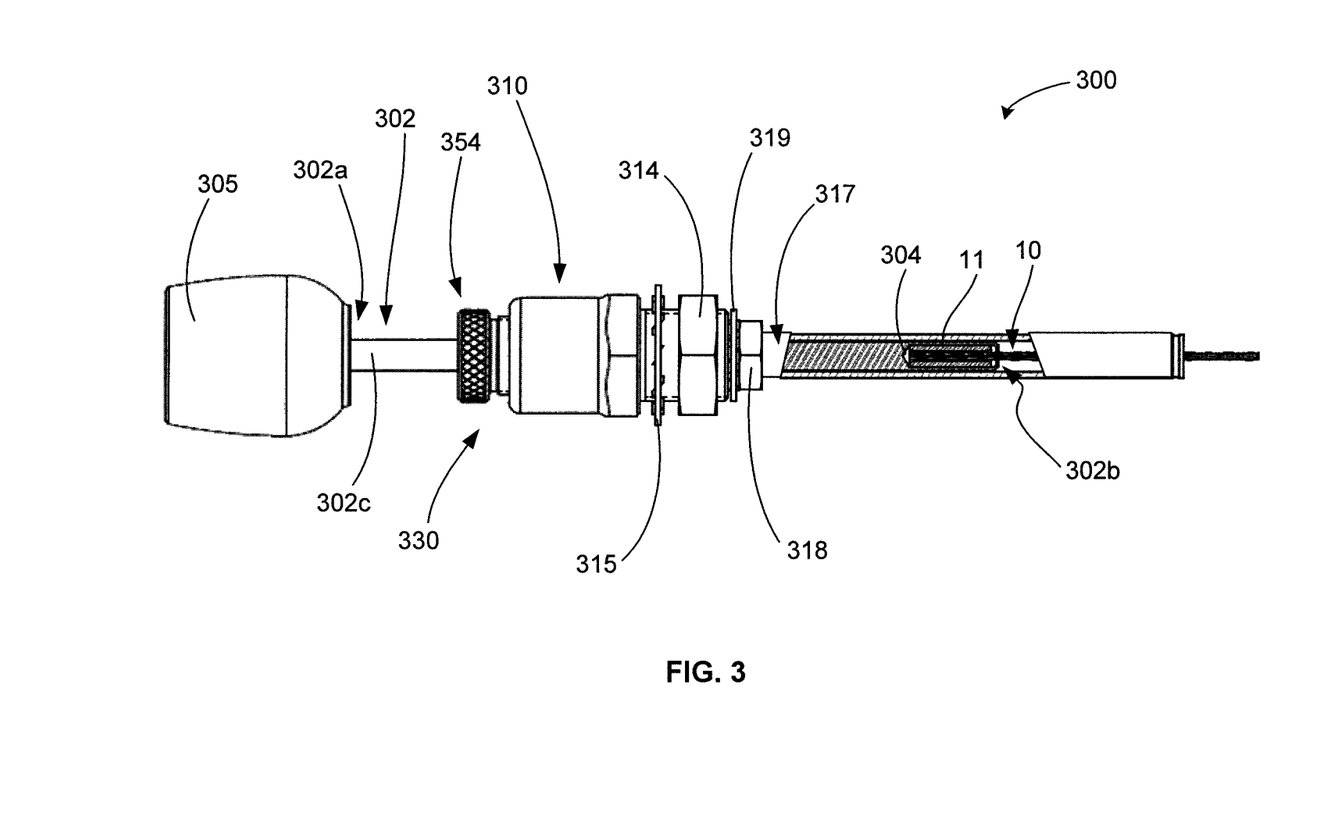
FIG. 3 is a side view of a push-pull control according to an embodiment, with a section removed for illustration.
Figure 8:
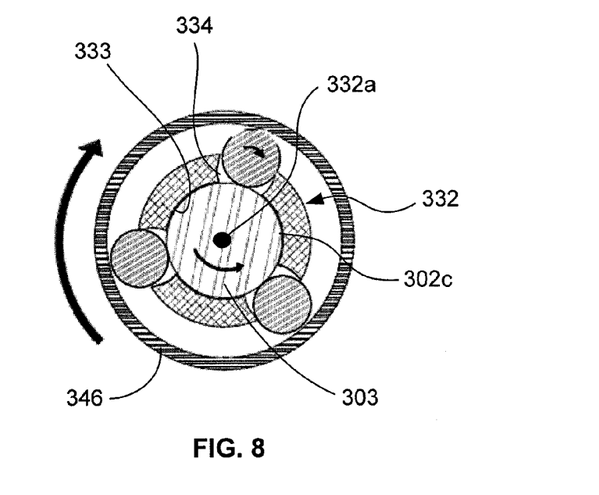
FIG. 8 is a section view taken from line A-A of FIG. 7.

As shown in FIG. 3, the push-pull control 300 includes a push rod 302, a base 310, and a rotational assist cartridge 330. The push rod 302 has proximal and distal ends 302a, 302b and is rigid and generally linear. It may be desirable for the push rod 302 to have a generally smooth outer surface 302c with a generally circular cross-section perimeter (FIG. 8). The cross-section perimeter (e.g., outer diameter) may be constant over the length of the push rod 302, or different portions may have different outer diameters. It should be appreciated, however, that the rotational assist cartridge 330 may only operate in conjunction with a portion having a generally constant outer diameter.

Numerous materials may be used to construct the push rod 302, and material selection may be based at least in part on the intended operating environment. For example, metals, woods, plastics, composites, and other materials may be appropriately used in different applications. Depending, for example, on the intended operating environment and material(s) used for construction, the push rod 302 may be have a generally solid interior 303, as shown in FIG. 8, or may have a hollow interior, a honeycomb-like interior, et cetera.

A knob 305 (FIG. 3) or other user input (e.g., handle, wheel, et cetera) extends from the push rod 302 generally at the proximal end 302a. The knob 305 may be fastened to the push rod 302 using adhesive, welding, mechanical fasteners, or any other appropriate fastener; or the knob 305 and the push rod 302 may have a unitary construction. Similar to the push rod 302, the knob 305 may be constructed of various materials, including metals, woods, plastics, and composites.

The distal end 302b of the push rod 302 may be coupled to the apparatus being controlled, either directly or (more commonly) through a cable or other force-transferring device. If cable 10 is used, for example, the cable 10 may be coupled to the distal end 302b in a way that allows the push rod 302 to rotate relative to the cable 10, such that the cable 10 is not wound and crimped. For example, as shown in FIG. 3, a terminal end 11 of the cable 10 may be housed in a hollow area 304 of the push rod 302 such that the push rod 302 is rotatable relative to the terminal end 11. Though not shown in FIG. 3, bearings or other swiveling apparatus may couple the cable 10 to the push rod 302, as will be readily understood by those skilled in the art.

The base 310 is, in general terms, a stationary element relative to which the push rod 302 travels. Accordingly, the base 310 may have an opening 312 (FIG. 5) through which the rod 302 passes. The base 310 shown in the accompanying drawings further houses a portion of the rotational assist cartridge 330 and includes threading 313 such that a nut 314 and a lock washer 315 may be used to fasten the base 310 to an environmental element (e.g., a dashboard, control panel, et cetera). More specifically, the environmental element may be placed between the base 310 and the nut 314 and washer 315, and the nut 314 may be tightened relative to the base 310. However, other methods and apparatus for coupling the base 310 to an environmental element may alternately be used, such as other threading arrangements, adhesive, welding, screws/bolts, rivets, or other mechanical fasteners; or the base 310 and the environmental element may have a unitary construction. As shown in FIG. 3, a hollow shaft 317 may be coupled to (e.g., by a jam nut 318 and a lock washer 319, as shown, or through any other appropriate fastening method), and extend from, the base 310; the push rod distal end 302b may accordingly travel inside the shaft 317.

Attention is now directed to the rotational assist cartridge 330, shown in FIGS. 3 through 9. The rotational assist cartridge 330 has a hollow pin cage 332, one or more roller pins 342, and pin cups 346. The pin cage 332 includes one or more pin slots 334, each extending along a respective helical path over a length of the pin cage 332, and each pin slot 334 (if more than one is included) is equi-angularly spaced about a center axis 332a (FIG. 8) of the pin cage 332. The center axis 332a also corresponds to a center axis of the push rod 302. In the embodiment 300, three pin slots 334 are included, and each helical path is angularly spaced one hundred and twenty degrees about the axis 332a of the pin cage 332, as shown in FIG. 8. Each pin slot 334 is a through opening extending to a hollow central area 333 (FIG. 8) of the pin cage 332.

The roller pins 342 are positioned inside the pin slots 334, and the embodiment 300 includes two roller pins 342 in each pin slot 334, such that two groups 343a, 343b of pins 342 are formed. The center points for each roller pin 342 in the first group 343a are at a common distance along the push rod 302, and the center points for each roller pin 342 in the second group 343b are at another common distance along the push rod 302. In other words, the center points for each roller pin 342 in the first group 343a lay on one plane perpendicular to the center axis 332a (and the center axis of the push rod 302), and the center points for each roller pin 342 in the second group 343b lay on another plane perpendicular to the center axis 332a (and the center axis of the push rod 302). The roller pins 342 have cylindrical or concaved center portions 342a and generally rounded ends 342b.

Figure 6:
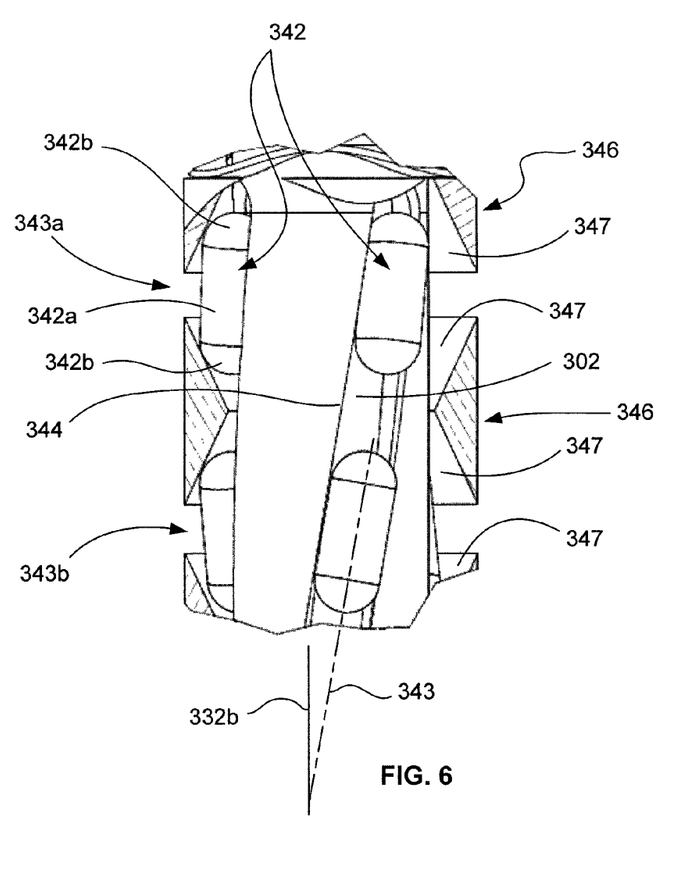
FIG. 6 is a section view taken from area A of FIG. 5.
Figure 7:
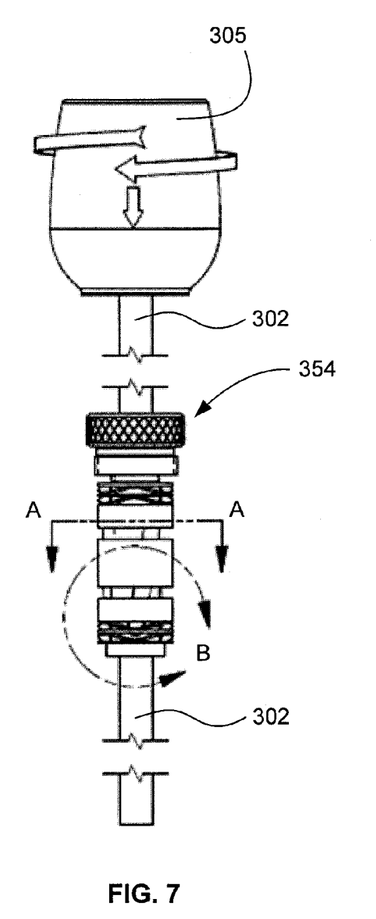
FIG. 7 is a broken view of the push-pull control of FIG. 3, with the panel nut and other elements omitted to illustrate interaction between the rotational assist cartridge and push rod.

As shown in FIG. 6, a center axis 343 of each pin 342 may be, for example, offset seven degrees from a line (e.g., line 332b) that is parallel to the axis 332a. In other words, each pin's central medial plane may be angularly offset from a respective central medial plane through the pushrod 302 that is perpendicular to the theoretical center point(s) of contact between the push rod 302 and the pins 342. Though other configurations may also be used, about a seven degree offset is currently preferred. The pin slots 342 allow the pins 342 to rotate freely about their axes 343 without changing the angle of the pressure plane 390 (discussed below) generated onto the push rod 302.

The pin cage 332 and the roller pins 342 may be constructed of various materials, including metals, ceramics, plastics, composites, woods, and other materials, depending for example on the intended operating environment and application. Materials may also be selected to minimize friction and/or wear between the pin cage 332 and the roller pins 342, and to provide effective interaction between the roller pins 342 and the push rod 302, and between the roller pins 342 and the pin cups 346. If the control 300 is intended for use as an aircraft throttle control, the pin cage 332 may be constructed, for example, of 6061-T6 aluminum or 2024-T4 aluminum, and the pins may be constructed, for example, of 440C stainless steel.

The pin cups 346 maintain the pins 342 in the pin slots 334 and are adjustable to increase and decrease an amount of force that the pins 342 place on the push rod 302. More particularly, the pin cups 346 have tapered ends 347 (FIG. 6) that interact with the respective pins 342, and specifically with the spherical ends 342b. By decreasing a distance between adjacent pin cups 346, the tapered ends 347 force the pins 342 further into the pin slots 334; interaction (and forces) between the pins 342 and the push rod 302 is accordingly increased. By increasing the distance between adjacent pin cups 346, the pins 342 are allowed to retract in the pin slots 334 from the push rod 302; interaction (and forces) between the pins 342 and the push rod 302 is accordingly decreased. The pin cups 346 may be constructed of various materials, including for example metals, ceramics, plastics, composites, and woods. If the control 300 is intended for use as an aircraft throttle control, the pin cups 346 may be constructed, for example, of 17-4PH H900 or H950 stainless steel.

Figure 4A:
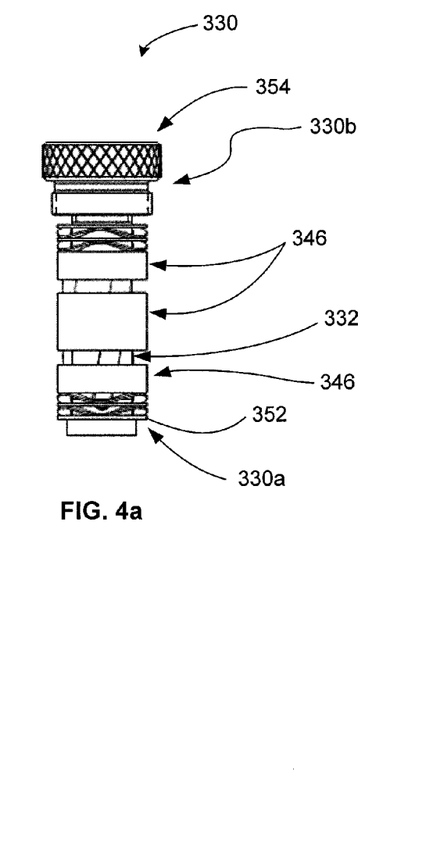
FIG. 4a is a top view of the rotational assist cartridge shown in FIG. 3.
Figure 4B:
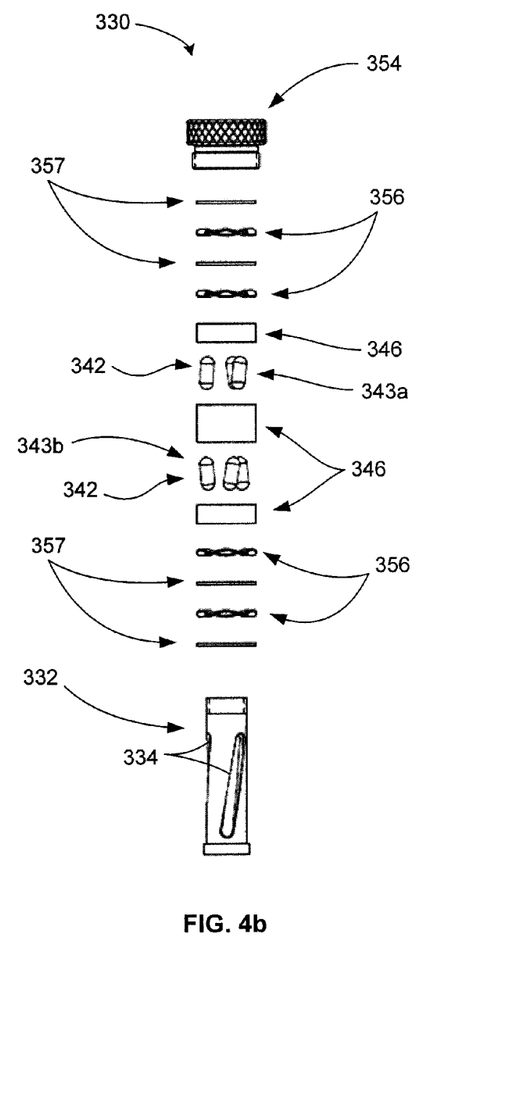
Figure 5:
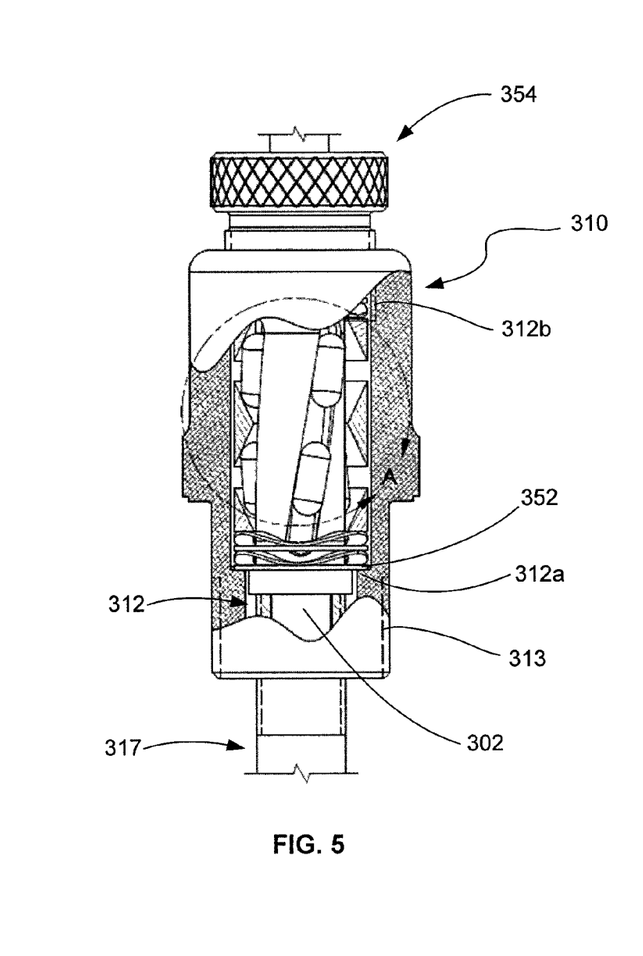
FIG. 5 is a partial view of the push-pull control of FIG. 3, with sections removed for illustration.

To adjust positioning of the pin cups 346, one portion 330a of the rotational assist cartridge 330 is free to rotate relative to the base 310 when in use, and another portion 330b is adjustable. For example, a flat washer 352 (FIGS. 4a through 5) may interact with a ledge 312a of the base 310 to fix the portion 330a relative to the base 310, as shown in FIG. 5, and various adjustment structure may be used. In the embodiment 300, a threaded tension nut 354 interacts with threading 312b on the base 310 to move the portion 330b relative to the base 310. To aid in regulating forces placed on the pin cups 346, wave washers 356 (or other resilient members) may interact with the pin cups 346. While two wave washers 356 (separated by flat washers 357) are shown with each of the outer pin cups 346, it should be clear that more or fewer resilient members may be included.

In use, the push-pull control 300 may generally appear as set forth in FIG. 3. The amount of compression on the pin cups 346—and thus the amount of force between the pins 342 and the push rod 302—may be adjusted using the tension nut 354.

If rotational input is not desired, the tension nut 354 may be drawn away from the flat washer 352 and the ledge 312a (FIG. 5), allowing the pin cups 346 to separate from one another. Separation of the pin cups 346 away from one another in turn allows the pins 342 to retract in the pin slots 334 from the push rod 302, decreasing interaction (and forces) between the pins 342 and the push rod 302. Interaction between the pins 342, the pin cups 346, and the push rod 302 is best shown in FIGS. 6 and 8. With little interaction between the pins 342 and the push rod 302, the push-pull control 300 may be unable to effectively use rotational input (i.e., turning of the knob 305) to release (or "push") or pull the cable 10. However, linear input (i.e., pushing or pulling of the knob 305) may be used to push or pull the cable 10 even with little or no interaction between the pins 342 and the push rod 302.

Even if rotational input is not desired, it may be desirable to maintain enough interaction between the pins 342 and the push rod 302 to temporarily retain the push rod 302 in a desired location relative to the base 310; otherwise, the push rod 302 could be free to move relative to the base 310 and constant user interaction with the push rod 302 (i.e., with the knob 305) may be required.

Figure 9:
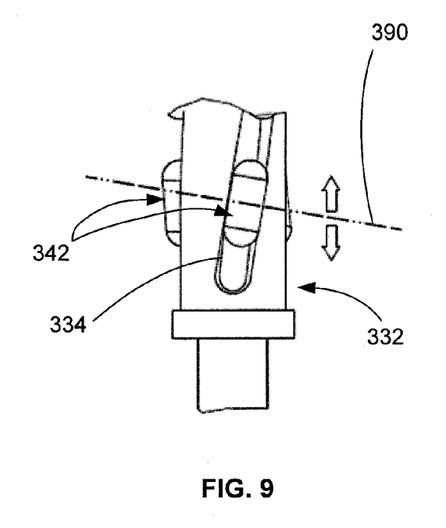
FIG. 9 is a section view taken from area B of FIG. 7.

If rotational input is desired, the tension nut 354 may be drawn toward the flat washer 352 and the ledge 312a (FIG. 5), forcing the pin cups 346 to move toward one another. Reducing the spacing between the pin cups 346 in turn causes the tapered ends 347 of the pin cups 346 to force the pins 342 further into the pin slots 334, increasing interaction (and forces) between the pins 342 and the push rod 302. Once a sufficient amount of interaction is present between the pins 342 and the push rod 302, rotational input (i.e., turning of the knob 305) releases or pulls the cable 10. More particularly, as shown in FIG. 9, the positioning of the roller pins 342 in the pin slots 334, when combined with friction generated between the rotating pins 342, produces a pressure plane 390 on the push rod 302. Due to the pressure plane 390, the push rod 302 is moved inward or outward depending on the direction of rotation. When the knob 305 is not being rotated, the interaction between the pins 342 and the push rod 302 temporarily retains the push rod 302 in a desired location relative to the base 310. Additionally, even when the rotational assist cartridge 330 is adjusted to use rotational input, the interaction between the roller pins 342 and the push rod 302 may be overcome by pushing or pulling the knob 305; and the cable 10 may therefore be released or pulled using linear input, without having a mechanical release to shift between utilizing rotational and linear input.

While linear input may be used at all times, without having a mechanical release to shift between utilizing rotational and linear input, it may nevertheless be desirable to move the tension nut 354 away from the flat washer 352 and the ledge 312a when linear input is desired. Doing so may reduce the amount of force necessary to move the push rod 302, as less interaction between the roller pins 342 and the push 302 has to be overcome.

Figures 10, 11, 12:
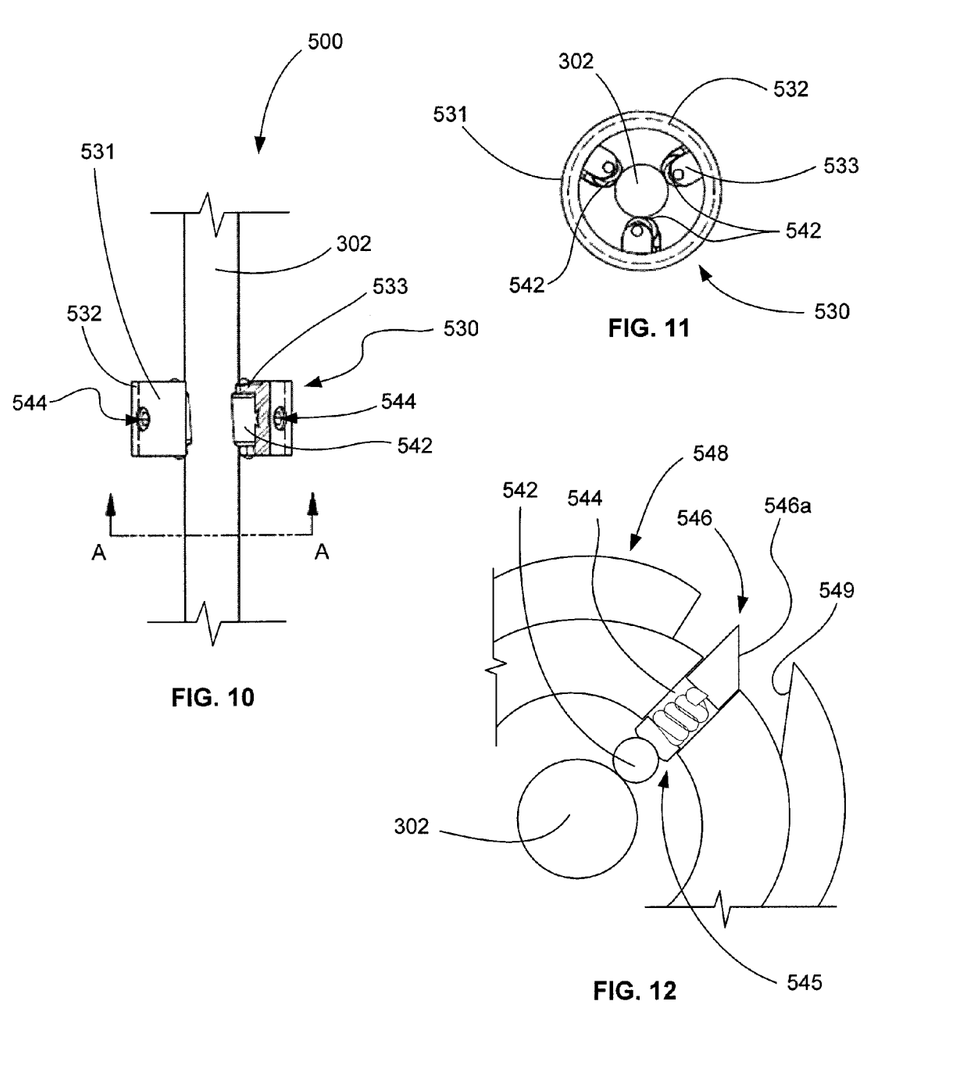
FIG. 10 is a partial view of a push-pull control according to another embodiment, with a section and elements removed for illustration.
FIG. 11 is a section view taken from line A-A of FIG. 10.
FIG. 12 is a section view of the push-pull control of FIG. 10.

FIGS. 10 through 12 show part of an alternate push-pull control 500. The push-pull control 500 is similar to the push-pull control 300 in many aspects. For uniformity and brevity, corresponding reference numbers may be used to indicate corresponding parts, though with any noted deviations.

The primary difference between the push-pull control 500 and the push-pull control 300 is that the rotational assist cartridge 330 is replaced with rotational assist cartridge 530. The rotational assist cartridge 530 may, for example, be coupled to the base 310 (which may be altered to receive the rotational assist cartridge 530 in the opening 312, with threads 532 of the rotational assist cartridge 530 interacting with threads 312b). Other couplings and configurations may alternately be used, and the principal requirement is that the location of the rotational assist cartridge 530 is fixed such that the push rod 302 is movable relative to the rotational assist cartridge 530.

The rotational assist cartridge 530 has rollers (or "roller pins" or "pins") 542 that are positioned in the same way relative to the push rod 302 as the roller pins 342 in the rotational assist cartridge 330. However, instead of a hollow pin cage 332 and pin cups 346 providing the positioning, the rollers 542 are held by arms 533 coupled to a frame 531. While the location of the rollers 542 may be fixed relative to the rod 302, it may be more desirable for the rollers 542 to be biased by springs. For example, the arms 533 may be stationary, and springs may be between the rollers 542 and the arms 533 to bias the rollers 542 toward the push rod 302; or the rollers 542 may be fixedly (though rotatably) coupled to the arms 533, and springs may couple the arms 533 to the frame 531 to bias the rollers 542 toward the push rod 302. Or, the rollers 542 may have rotatable axes movable along predetermined paths, and spring plungers 545 (FIG. 12) in channels 544 (FIGS. 10 and 12) may interact with the rollers 542 to bias the rollers 542 toward the push rod 302.

Numerous methods may be used to adjust the forces provided by the springs. For example, a pin 546 with an angled end 546a may extend from each spring plunger 545, and a collar 548 with angled faces 549 may be rotated to force the pins 546 toward the springs plungers 545 (and increase pressure provided by the springs 545) or allow the pins 546 to retract from the springs 545 (and decrease pressure provided by the springs 545). Those skilled in the art will be able to implement alternate methods of adjusting the pressure provided by the springs upon receiving a single user input, or by adjusting the pressure of each spring individually.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims.

The invention claimed is:

1. A push-pull control utilizing both linear and rotational inputs to create linear output without requiring a user-operated release for switching from rotational input to linear input, the control comprising:
   an elongate push rod having proximal and distal ends, a smooth outer surface, a circular cross-section perimeter, and a center axis; the push rod being rotatable and slidable along the push rod axis; the push rod distal end being configured to directly or indirectly interact with an apparatus to be controlled;
   a user input at the push rod proximal end;
   a base having an opening through which the push rod passes, rotational and sliding movement of the push rod along the push rod axis being movement relative to the base;
   a roller pin having a smooth outer surface and a center axis and being rotatable about the roller pin center axis; and
   a rotational assist cartridge adjacent the push rod and rotatable relative to the base, the rotational assist cartridge positioning the roller pin such that:
      (a) at least one point of the roller pin outer surface contacts the push rod outer surface; and
      (b) the roller pin center axis is angularly offset from and non-intersecting with the push rod center axis.

2. The control of claim 1, further comprising at least one additional roller pin having a smooth outer surface and a center axis and being rotatable about the roller pin center axis, and wherein:
   at least one point of each additional roller pin outer surface contacts the push rod outer surface;
   the roller pin and the at least one additional roller pin are spaced generally equi-angularly about the push rod center axis; and
   the center axis of each additional roller pin is angularly offset from and non-intersecting with the push rod center axis; and
   an amount of angular offset is generally the same for the roller pin and each additional roller pin.

3. The control of claim 2, wherein at least two points of the roller pin outer surface simultaneously contact the push rod outer surface.

4. The control of claim 3, wherein:
   the roller pin has a cylindrical or concaved central portion and spherical ends;
   each additional roller pin has a cylindrical or concaved central portion and spherical ends; and
   at least two points of each additional roller pin outer surface simultaneously contact the push rod outer surface.

5. The control of claim 2, wherein:
   the rotational assist cartridge includes a pin cage having a hollow central area and a plurality of pin slots, the pin slots being through openings extending to the pin cage hollow central area; and
   the roller pin and the at least one additional roller pin are positioned in the pin slots.

6. The control of claim 5, wherein:
   the roller pin has a cylindrical or concaved central portion and spherical ends;
   the rotational assist cartridge includes two pin cups positioned on opposite ends of the roller pin and has tapered ends abutting the roller pin spherical ends;
   decreasing distance between the two pin cups causes an increase in forces between the roller pin and the push rod; and
   increasing distance between the two pin cups causes a decrease in forces between the roller pin and the push rod.

7. The control of claim 6, wherein the rotational assist cartridge includes means for adjusting distance between the two pin cups.

8. The control of claim 6, wherein the rotational assist cartridge includes a movable tension nut for adjusting distance between the two pin cups.

9. The control of claim 8, wherein:
   at least a portion of the rotational assist cartridge is housed in the base; and
   the tension nut is threadably received by a threaded portion of the base.

10. The control of claim 9, wherein the rotational assist cartridge includes a resilient member for regulating distance between the two pin cups.

11. The control of claim 10, wherein the amount of angular offset for the roller pin and each additional roller pin is about seven degrees.

12. The control of claim 1, wherein the rotational assist cartridge includes means for adjusting forces between the roller pin and the push rod.

13. The control of claim 1, wherein the circular cross-section perimeter of the push rod is generally constant from the push rod proximal end to the push rod distal end.

14. The control of claim 1, wherein the user input is a knob.

15. The control of claim 1, wherein the apparatus to be controlled is a throttle.

16. A push-pull control utilizing both linear and rotational inputs to create linear output without requiring a user-operated release for switching from rotational input to linear input, the control comprising:

an elongate push rod having proximal and distal ends, a smooth outer surface, a circular cross-section perimeter, and a center axis; the push rod distal end being configured to directly or indirectly interact with an apparatus to be controlled;

a user input at the push rod proximal end;

a base having an opening through which the push rod passes, movement of the push rod being movement relative to the base;

a plurality of roller pins separated into first and second groups; each roller pin having a cylindrical central portion, a first spherical end, a second spherical end, a center point, and a center axis, and being rotatable about the roller pin center axis; and a rotational assist cartridge adjacent the push rod and at least partially housed in the base, the rotational assist cartridge including:

(a) a pin cage having a hollow central area and a plurality of pin slots, the pin slots being through openings extending to the pin cage hollow central area, the pin slots being equi-angularly spaced about a center axis of the pin cage, each pin slot extending along a respective helical path over a length of the pin cage, one roller pin of the first group and one roller pin of the second group being positioned in each pin slot, the center points for each roller pin in the first group laying on one plane generally perpendicular to the pin cage center axis, the center points for each roller pin in the second group laying on another plane generally perpendicular to the pin cage center axis;

(b) a first pin cup positioned between the first group of roller pins and the push rod proximal end, the first pin cup having a tapered end abutting the first spherical ends of the roller pins in the first group;

(c) a second pin cup positioned between the second group of roller pins and the push rod distal end, the second pin cup having a tapered end abutting the first spherical ends of the roller pins in the second group;

(d) a third pin cup positioned between the first and second groups of roller pins, the third pin cup having a tapered end abutting the second spherical ends of the roller pins in the first group, the third pin cup having a tapered end abutting the second spherical ends of the roller pins in the second group;

(e) a resilient member relatively biasing the first and second pin cups toward one another;

(f) a tension nut threadably received by a threaded portion of the base and movable to adjust spacing between the first, second, and third pin cups; decreasing spacing between the first, second, and third pin cups causing an increase in forces between the roller pins and the push rod; increasing spacing between the first, second, and third pin cups causing a decrease in forces between the roller pins and the push rod;

wherein at least two points of each roller pin central portion simultaneously contact the push rod outer surface;

wherein each roller pin center axis is angularly offset from and non-intersecting with the push rod center axis, the amount of angular offset being generally the same for each roller pin and being greater than zero degrees;

wherein the push rod is slidable along the push rod axis using linear input regardless of the forces between the roller pins and the push rod; and wherein the push rod slides along the push rod axis upon receiving rotational input when sufficient forces exist between the roller pins and the push rod.

17. The control of claim 16, wherein:

the circular cross-section perimeter of the push rod is generally constant from the push rod proximal end to the push rod distal end;

the user input is a knob; and the apparatus to be controlled is a throttle.

18. A push-pull control utilizing both linear and rotational inputs to create linear output, the control comprising:

an elongate push rod having proximal and distal ends, an interaction portion having an unthreaded outer surface, and a center axis; the push rod distal end being configured to directly or indirectly interact with an apparatus to be controlled;

a user input at the push rod proximal end;

at least one roller pin having an outer surface and a center axis and being rotatable about the roller pin center axis;

a rotational assist cartridge adjacent the push rod interaction portion, movement of the push rod being movement relative to the rotational assist cartridge, the rotational assist cartridge positioning the at least one roller pin such that:

(a) at least two points of each roller pin outer surface simultaneously contact the push rod outer surface;

(b) a central medial plane of each roller pin is angularly offset from a central medial plane through the pushrod that is perpendicular to a theoretical center point of contact between the push rod and each roller pin; and (c) an amount of angular offset is generally the same for each roller pin and is greater than zero degrees; and means for adjusting forces between the at least one roller pin and the push rod, the push rod being slidable along the push rod axis using linear input regardless of the forces between the at least one roller pin and the push rod, the push rod sliding along the push rod axis upon receiving rotational input when sufficient forces exist between the at least one roller pin and the push rod.

19. A push-pull control utilizing both linear and rotational inputs to create linear output without requiring a user-operated release for switching from rotational input to linear input, the control comprising:

an elongate push rod having proximal and distal ends, an outer surface, a generally circular cross-section perimeter, and a center axis; the push rod being rotatable and slidable along the push rod axis; the push rod distal end being configured to directly or indirectly interact with an apparatus to be controlled;

a user input at the push rod proximal end; and a roller pin having a center axis and an outer surface that contacts the push rod outer surface, the roller pin center axis being angularly offset from and non-intersecting with the pushrod center axis, an amount of the angular offset being greater than zero degrees.

20. The control of claim 19, wherein the push rod outer surface is generally smooth, wherein the roller pin outer surface is generally smooth and cylindrical or concaved, and further comprising another roller pin having a center axis and an outer surface that contacts the push rod outer surface.

* * * * *